United States Patent
Liu et al.

(10) Patent No.: US 9,495,666 B2
(45) Date of Patent: Nov. 15, 2016

(54) END-USER PORTAL SYSTEM FOR REMOTE TECHNICAL SUPPORT

(75) Inventors: Xingxin Liu, Union City, CA (US); Roy Vera, Houston, TX (US); Michael P. Duffy, Highland Village, TX (US); William C. Hall, Cedar Park, TX (US)

(73) Assignee: Accenture Global Services Limited, Dublin (IE)

( * ) Notice: Subject to any disclaimer, the term of this patent is extended or adjusted under 35 U.S.C. 154(b) by 974 days.

(21) Appl. No.: 13/326,613

(22) Filed: Dec. 15, 2011

(65) Prior Publication Data

US 2013/0159881 A1   Jun. 20, 2013

(51) Int. Cl.
  *G06F 3/00* (2006.01)
  *G06F 3/048* (2013.01)
  *G06Q 10/00* (2012.01)

(52) U.S. Cl.
  CPC ..................... *G06Q 10/20* (2013.01)

(58) Field of Classification Search
  CPC ........... G06F 9/4446; G06F 17/30861; G06F 17/30864
  See application file for complete search history.

(56) References Cited

U.S. PATENT DOCUMENTS

| | | | |
|---|---|---|---|
| 5,257,185 A * | 10/1993 | Farley | G06N 5/02 |
| 5,815,566 A | 9/1998 | Ramot et al. | |
| 5,983,369 A * | 11/1999 | Bakoglu | G06F 11/2294 714/25 |
| 6,199,061 B1 * | 3/2001 | Blewett et al. | |
| 6,260,048 B1 * | 7/2001 | Carpenter et al. | |
| 6,260,160 B1 | 7/2001 | Beyda et al. | |
| 6,357,017 B1 * | 3/2002 | Bereiter | G06F 11/0748 714/25 |
| 6,408,066 B1 | 6/2002 | Andruska et al. | |
| 6,477,531 B1 * | 11/2002 | Sullivan | G06F 17/30873 |
| 6,515,681 B1 * | 2/2003 | Knight | G06Q 10/107 707/999.003 |
| 6,550,006 B1 | 4/2003 | Khanna | |
| 6,615,240 B1 * | 9/2003 | Sullivan et al. | 709/205 |
| 6,618,162 B1 | 9/2003 | Wiklof et al. | |

(Continued)

FOREIGN PATENT DOCUMENTS

| JP | 2003-196407 A | 11/2003 |
|---|---|---|
| JP | 2003-330826 A | 11/2003 |

(Continued)

OTHER PUBLICATIONS

CyberMedia's self-help, Nov. 25, 1996, Compterworld, 1 page.*

(Continued)

*Primary Examiner* — Yongjia Pan
(74) *Attorney, Agent, or Firm* — Harrity & Harrity, LLP

(57) ABSTRACT

A controller provides information regarding end-user dictated content for a plurality of technical support topics to an end-user device prior to the controller receiving any indication of specific technical support required by the end-user. Additionally, the controller provides information regarding available automated technical support to the end-user device prior to the controller receiving any indication of specific technical support required by the end-user. The end-user device provides an indication of selection of at least a portion of the either the information regarding end-user dictated content for a plurality of technical support topics or the information regarding available automated technical support. By providing such information prior to receiving any indication of the specific technical support required by the end-user, the likelihood that the end-user can successfully resolve his/her issue without further intervention is increased.

28 Claims, 5 Drawing Sheets

(56) References Cited

U.S. PATENT DOCUMENTS

| | | | |
|---|---|---|---|
| 6,742,141 B1* | 5/2004 | Miller | 714/26 |
| 6,857,013 B2 | 2/2005 | Ramberg et al. | |
| 6,879,972 B2* | 4/2005 | Brandon | G06Q 10/06 706/14 |
| 6,999,990 B1* | 2/2006 | Sullivan et al. | 709/205 |
| 7,023,979 B1 | 4/2006 | Wu et al. | |
| 7,181,512 B1 | 2/2007 | Lesher et al. | |
| 7,203,909 B1* | 4/2007 | Horvitz | G06F 17/30867 707/E17.109 |
| 7,260,597 B1 | 8/2007 | Hofrichter et al. | |
| 7,305,465 B2 | 12/2007 | Wing et al. | |
| 7,328,242 B1* | 2/2008 | McCarthy | G06Q 10/10 709/203 |
| 7,350,146 B2* | 3/2008 | Moran et al. | 715/707 |
| 7,353,016 B2* | 4/2008 | Roundtree et al. | 455/414.1 |
| 7,359,891 B2* | 4/2008 | Nishino et al. | |
| 7,430,290 B2 | 9/2008 | Zhu | |
| 7,506,257 B1* | 3/2009 | Chavez et al. | 715/714 |
| 7,580,906 B2* | 8/2009 | Faihe | 706/14 |
| 7,657,513 B2* | 2/2010 | Richardson et al. | 707/999.003 |
| 7,809,811 B1* | 10/2010 | Rao | G06F 15/173 709/221 |
| 8,036,935 B2* | 10/2011 | Burger | G06Q 30/0226 705/14.27 |
| 8,223,349 B2* | 7/2012 | Takahashi | G03G 15/5075 358/1.1 |
| 8,452,781 B2* | 5/2013 | Stefik et al. | 707/749 |
| 8,554,540 B2* | 10/2013 | Lee et al. | 704/9 |
| 8,560,369 B2* | 10/2013 | Messer | 705/7.14 |
| 8,589,434 B2* | 11/2013 | Liebald et al. | 707/771 |
| 8,666,921 B2* | 3/2014 | Fisher, Jr. | 706/46 |
| 8,688,706 B2* | 4/2014 | Liebald et al. | 707/738 |
| 8,694,369 B2* | 4/2014 | Burger et al. | 705/14.27 |
| 8,762,326 B1* | 6/2014 | Zhou et al. | 707/609 |
| 2002/0018554 A1 | 2/2002 | Jensen et al. | |
| 2002/0103582 A1 | 8/2002 | Ohmura et al. | |
| 2002/0123983 A1* | 9/2002 | Riley et al. | 707/1 |
| 2002/0147974 A1 | 10/2002 | Wookey | |
| 2002/0161600 A1* | 10/2002 | Stubiger et al. | 705/1 |
| 2003/0031992 A1 | 2/2003 | Laferriere et al. | |
| 2003/0083941 A1* | 5/2003 | Moran | G06Q 30/0251 705/14.49 |
| 2004/0049394 A1* | 3/2004 | Burger | G06Q 30/0226 709/223 |
| 2004/0128585 A1 | 7/2004 | Hind et al. | |
| 2004/0236843 A1 | 11/2004 | Wing et al. | |
| 2005/0223285 A1 | 10/2005 | Faihe et al. | |
| 2006/0004763 A1* | 1/2006 | Horvitz | G06F 17/30867 |
| 2006/0083521 A1 | 4/2006 | Simpson et al. | |
| 2006/0277096 A1 | 12/2006 | Levitus | |
| 2007/0100782 A1 | 5/2007 | Reed et al. | |
| 2007/0294368 A1 | 12/2007 | Bomgaars et al. | |
| 2007/0299575 A1 | 12/2007 | Yamada et al. | |
| 2008/0033882 A1 | 2/2008 | Kafkarkou et al. | |
| 2008/0034060 A1 | 2/2008 | Fisher, Jr. | |
| 2008/0091454 A1 | 4/2008 | Fisher, Jr. | |
| 2008/0147789 A1 | 6/2008 | Wing et al. | |
| 2008/0172574 A1* | 7/2008 | Fisher | G06Q 10/06 714/25 |
| 2008/0215450 A1 | 9/2008 | Gates | |
| 2008/0228696 A1 | 9/2008 | Fano | |
| 2008/0267178 A1 | 10/2008 | Emmerich et al. | |
| 2009/0012838 A1 | 1/2009 | DeJong et al. | |
| 2009/0018890 A1 | 1/2009 | Werth et al. | |
| 2009/0024948 A1 | 1/2009 | Anka | |
| 2009/0034411 A1 | 2/2009 | Bernard | |
| 2009/0043669 A1* | 2/2009 | Hibbets et al. | 705/26 |
| 2009/0049343 A1 | 2/2009 | Katz et al. | |
| 2009/0063175 A1* | 3/2009 | Hibbets et al. | 705/1 |
| 2009/0089751 A1* | 4/2009 | Raikes | G06F 9/4446 717/120 |
| 2009/0125608 A1 | 5/2009 | Werth et al. | |
| 2009/0132307 A1 | 5/2009 | Messer | |
| 2009/0216697 A1 | 8/2009 | Beaty et al. | |
| 2010/0054453 A1 | 3/2010 | Stewart | |
| 2010/0131899 A1* | 5/2010 | Hubert | 715/823 |
| 2010/0218012 A1 | 8/2010 | Joseph et al. | |
| 2010/0246801 A1 | 9/2010 | Sundaram et al. | |
| 2010/0280985 A1* | 11/2010 | Duchon et al. | 706/52 |
| 2011/0087511 A1 | 4/2011 | Werth et al. | |
| 2011/0208857 A1 | 8/2011 | Gentile | |
| 2012/0265800 A1* | 10/2012 | Tuchman et al. | 709/203 |
| 2012/0271829 A1* | 10/2012 | Jason | 707/740 |
| 2015/0248473 A1* | 9/2015 | Kenedy | G06F 17/30867 707/749 |

FOREIGN PATENT DOCUMENTS

| | | |
|---|---|---|
| JP | 2005-275946 A | 6/2005 |
| JP | 2008-152618 A | 3/2008 |

OTHER PUBLICATIONS

"Realization of a Web-Based Remote Service Platform", Yin, et al., 2006—Proceedings of the 10th International Conference on Computer Supported Cooperative Work in Design.

Examiner's First Report issued in AU Application 2011200590 May 10, 2011.

Examiner's Second Report issued in AU Application 2011200588 Nov. 1, 2011.

* cited by examiner

END-USER PORTAL SYSTEM FOR REMOTE TECHNICAL SUPPORT

CROSS-REFERENCE TO RELATED APPLICATION

The instant application is related to co-pending U.S. patent application Ser. No. 12/705,697 entitled "Remote Technical Support Employing A Configurable Executable Application" and filed on Feb. 15, 2010, and co-pending U.S. patent application Ser. No. 12/705,702 entitled "Multiple Simultaneous Session Support By A Remote Technician" and also filed on Feb. 15, 2010, the teachings of which prior applications are incorporated herein by this reference.

FIELD

The instant disclosure relates generally to the provision of remote technical support for user devices and, in particular, to the provision of such remote technical support through the use of an end-user portal system.

BACKGROUND

As the use of electronic devices has increased, so has the need for technical support when such devices fail to operate as desired. As used herein, technical support includes any and all activities involved with diagnosing and potentially fixing a malfunctioning device. In some contexts (e.g., a large, commercial enterprise), such technical support is provided by a staff of on-site technicians. For example, a business having a relatively large number of computer users may employ a number of technicians particularly knowledgeable about the hardware and software systems used by the business. When problems occur with the computers of individual users, technicians may be deployed to the locations of such users to provide the necessary technical support. Typically, through historical knowledge about the level of support required to sustain a given number of computer users, the size of the dedicated technical support staff can be adjusted to meet predicted needs. While this approach can be effective at keeping computer users functioning most efficiently, it is relatively expensive to maintain a staff of on-site, dedicated technicians. In this era of improved connectivity (given the ubiquity of public and private computer networks), the need to service computer users, including many relatively remote users, has increased. In the event that the various computer users are spread out over a large geographic area, the provision of a dedicated staff of technicians may not be feasible.

Furthermore, not all device users are affiliated with large entities having the resources to provide dedicated technical support staff. For example, it is estimated that there are approximately 1.2 billion personal computers worldwide, including 264.1 million personal computers in the United States alone. While it is possible to engage a service in which technicians make "house calls", such service is comparatively expensive for the average home computer user. Given this, various solutions have been more recently proposed to provide remote technical support service delivered through the above-mentioned ubiquitous networks such as the Internet. For example, U.S. Patent Application Publication Nos. 2006/0277096 (in the name of Levitus), 2008/0147789 (in the name of Wing et al.), 2008/0172574 (in the name of Fisher) and 2009/0125608 (in the name of Werth et al.) describe various systems of the type generally illustrated in FIG. 1. As shown in FIG. 1, the system 100 comprises a plurality of user devices 102 that are able to communicate with a remote technical support system 104 via one or more intervening networks 106, which may include public networks (such as the Internet), private networks (such as local area networks, virtual private networks, etc.) or combinations thereof. A plurality of remote technicians 108 perform the desired technical support activities for the user devices 102 as mediated by the remote technical support system 104. Although the user devices 102 are often computers, other types of devices may equally benefit from such remote technical support, such as television cable set-top boxes, televisions, cellular telephones, automobiles or even more mundane devices such as kitchen appliances. The remote technical support system 104 is a centralized service provided in the form, for example, of a web service that may be accessed through an appropriately configured web interface. The remote technical support system 104 coordinates service requests from the user devices 102 and the deployment of the remote technicians 108 to service such requests. As illustrated, in one embodiment, the remote technicians 108$a$ may access both the user devices 102 being serviced and the remote technical support system 104 via the one or more networks 106. Alternatively, the remote technicians 108$b$ may be directly coupled to the remote technical support system 104 through proprietary connections while still servicing the user devices 102 via the network(s) 106. Because the remote technical support system 104 mediates all interactions with the requesting user, the remote technician can be located virtually anywhere so long as he/she is able to communicate with the remote technical support system 104. Using various remote servicing tools, the remote technicians 108 are able to interact with the user devices 102 to provide the requested technical support.

While such systems may be employed to better service end-users requiring technical support, it is estimated that a substantial percentage of technical service requests (perhaps as much as 40%) could be handled by the end-user themselves. However, current techniques for providing remote technical support are not configured to facilitate such self-help. Thus, it would be advantageous to provide techniques that improve upon current remote technical support systems.

SUMMARY

The instant disclosure describes techniques for providing technical support to an end-user via a technical support controller incorporating an end-user portal system. In an embodiment, the controller provides information regarding end-user dictated content for a plurality of technical support topics to an end-user device prior to the controller receiving any indication of specific technical support required by the end-user. Additionally, the controller provides information regarding available automated technical support to the end-user device prior to the controller receiving any indication of specific technical support required by the end-user. In this instance, the available automated technical support is selected by the controller based on information about the end-user. Thereafter, the controller receives, from the end-user device, an indication of selection of at least a portion of the either the information regarding end-user dictated content for a plurality of technical support topics or the information regarding available automated technical support. In various embodiments, the information regarding the end-user dictated content may comprise information regarding at least one most-frequently selected technical support topic, information regarding most frequently searched keywords or end-user editable content regarding the plurality of technical support topics. In another embodiment, the information regarding available automated technical support may comprise information regarding automated processing that may be performed on the end-user device at the end-user's request. In a further embodiment, the controller may provide information regarding a mechanism to initiate communication with a technical support technician, once again prior to the controller receiving any indication of specific technical support required by the end-user. In response, the controller may receive an indication of selection of the mechanism to initiate communication with the technical support technician. Related apparatus are also disclosed herein.

BRIEF DESCRIPTION OF THE DRAWINGS

The features described in this disclosure are set forth with particularity in the appended claims. These features will become apparent from consideration of the following detailed description, taken in conjunction with the accompanying drawings. One or more embodiments are now described, by way of example only, with reference to the accompanying drawings wherein like reference numerals represent like elements and in which:

DETAILED DESCRIPTION

Figure 1:
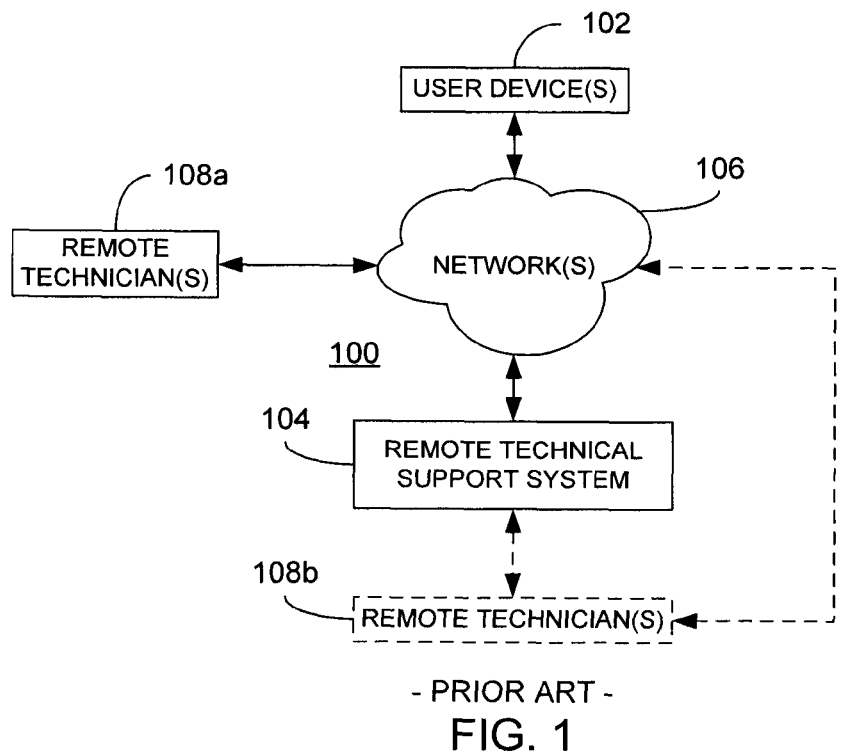
FIG. 1 is a block diagram of a system for remotely providing technical support services in accordance with the prior art.
Figure 2:
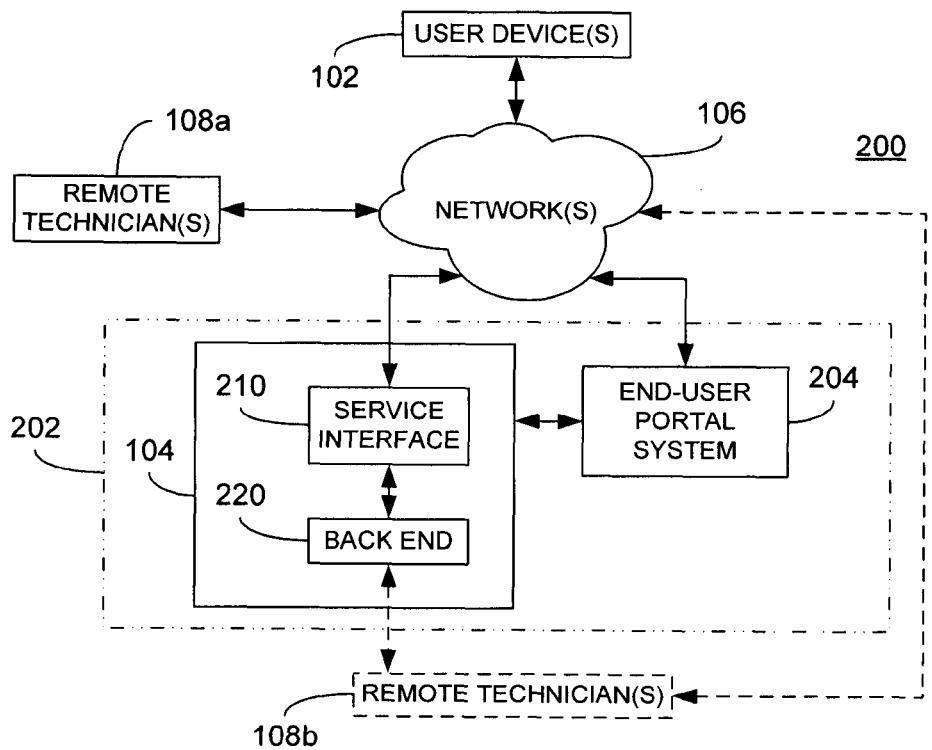
FIG. 2 is a block diagram of a system for remotely providing technical support services and incorporating an end-user portal system in accordance with an embodiment of the instant disclosure.

Referring now to FIG. 2, a block diagram of a system 200 for remotely providing technical support services via a technical support controller 202 incorporating an end-user portal system 204 is illustrated. Similar to FIG. 1 described above, the system 200 may comprise a plurality of end-users operating end-user devices 102 and a plurality of remote technician workstations 108, all in communication with the technical support controller 202. As further shown, the technical support controller 202 comprises the remote technical support system 104 as well as an end-user portal system 204. As noted above, communications between the technical support controller 104 and the remote technician workstation(s) 308 may be mediated by the one or more networks 106. The remote technician workstation(s) 308 may each comprise one or more computers, such as, for example, desktop or laptop computers, capable of communicating with the technical support controller 104. Other devices such as tablet computers, or any other device capable of communicating with the technical support controller 104 may also be used. In a similar vein, the end-user devices 102 may likewise each comprises a computer or other similarly capable devices, such as mobile computing devices including handheld computers, smartphones and the like.

In accordance with those embodiments taught in U.S. patent application Ser. Nos. 12/705,697 and 12/705,702 (respectively referred to hereinafter as "the '697 application" and "the '702 application"), the teachings of which have been incorporated herein by reference above, the remote technical support system 104 may comprise a service interface 210 and a back end 220. (Note that remote technical support system 104 is referred to as the "technical support controller" in both the '697 application and the '702 application, but has been renamed herein to avoid confusion.) As shown, the service interface 210 couples directly to the one or more networks 106 that may be used to provide end-users with access to the services provided by the remote technical support system 104. To this end, the service interface 210 may comprise at least one server computer implementing one or more interactive web pages that an end user may access. For example, such web pages may be implemented using a web application framework such as ASP.NET or JavaServer Pages. The service interface 210 can be used, in one embodiment, to receive service requests from end users, which service requests may specify a user device (e.g., computer, etc. as noted above) that the end user is currently experiencing problems with as well as the nature of the problems being experienced. Alternatively, or additionally, the service interface 210 can provide the end user with the necessary interface to allow the user to interact with a remote technician. For example, the service interface 210 may provide the end user with one or more selectable input mechanisms (e.g., one or more buttons, hyperlinks, drop down menu items, etc.) that, when selected, initiate communications between the end user (and, potentially, the user device to be serviced) and the remote technician's workstation 108. Further still, the service interface 210 can implement those functions necessary to control and manage processing of service requests by the remote technicians, as described in greater detail in the '697 application and the '702 application.

The back end 220, which may likewise comprise one or more database server computers, implements all of the data storage, reporting and business logic functions used to implement the remote technical support system 104. For example, the back end 304 may comprise one or more database servers implementing a suitable database management system (DBMS) such as Oracle Database, MySQL, etc. Using such data storage mechanisms, all data concerning pending service requests, information regarding known problems for various end-user devices, etc. may be stored.

However, in another embodiment described herein, the end-user, rather than directly accessing the remote technical support system 104, first interacts with the end-user portal system 204 in an effort to address the end-user's technical services needs without the intervention of a remote technician; referred to herein as "self-help." In this embodiment, mechanisms for interacting with a remote technician may likewise be provided to the end-user via the end-user portal system 204 in addition to various self-help options prior to the user specifying the nature of his/her specific technical support need. To this end, the end-user portal system 204 may comprise one or more server computers implementing one or more interactive web pages, as well as data storage capabilities as described above. Further description regarding the end-user portal system 204 is provided with reference to FIG. 4 below.

It is noted that the system 200 illustrated in FIG. 2 may be used in a variety of contexts. For example, in one embodiment, the technical support controller 202 may be deployed in support of a specific enterprise. In this case, only authorized end-users and their devices 102 are allowed to access the technical support controller 202. On the other hand, the technical support controller 202 could also be implemented as a publicly available, web-based service (for example, on a pay-as-you-go basis). Still further implementations, which will be readily apparent to those having skill in the art, would incorporate the same functional aspects of the instant disclosure.

Figure 3:
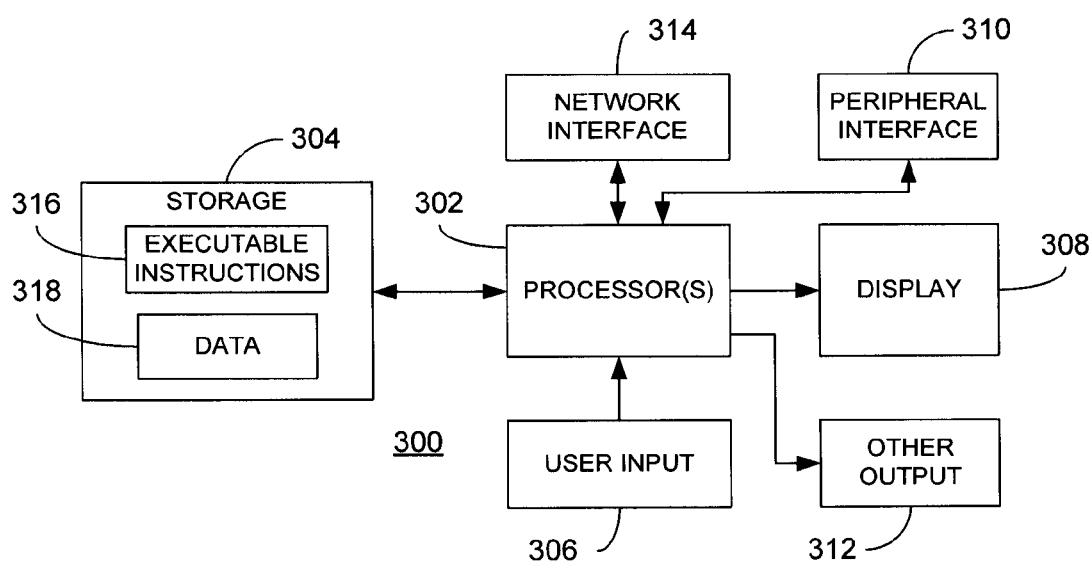
FIG. 3 is a block diagram of a processing device that may be used to implement various aspects of the instant disclosure.

Referring now to FIG. 3, an illustration of a representative processing device 300 that may be used to implement the teachings of the instant disclosure is shown. In particular, one or more instances of the device 300 may be used to implement, in one embodiment, the remote technician workstation(s) 108 and remote technical support system 104 of FIG. 2, and/or the end-user portal system 204 of FIGS. 2 and 4. Additionally, in an embodiment of the instant disclosure, the user devices to be serviced (e.g., computers) may also take the general form illustrated in FIG. 3. Regardless, the device 300 comprises a processor 302 coupled to a storage device 304. The storage device 304, in turn, comprises stored executable instructions 316 and data 318. In an embodiment, the processor 302 may comprise one or more processing devices such as a microprocessor, microcontroller, digital signal processor, or combinations thereof capable of executing the stored instructions 316 and operating upon the stored data 318. Likewise, the storage device 304 may comprise one or more devices such as volatile or nonvolatile memory including but not limited to random access memory (RAM) or read only memory (ROM). Processor and storage arrangements of the types illustrated in FIG. 3 are well known to those having ordinary skill in the art. In one embodiment, the various processing techniques described herein are implemented as a combination of executable instructions and data within the storage component 304.

As shown, the device 300 may comprise one or more user input devices 306, a display 308, a peripheral interface 310, other output devices 312 and a network interface 314 in communication with the processor 302. The user input device 306 may comprise any mechanism for providing user input to the processor 302. For example, the user input device 306 may comprise a keyboard, a mouse, a touch screen, microphone and suitable voice recognition application or any other means whereby a user of the device 300 may provide input data to the processor 302. The display 308, may comprise any conventional display mechanism such as a cathode ray tube (CRT), flat panel display, or any other display mechanism known to those having ordinary skill in the art. In an embodiment, the display 308, in conjunction with suitable stored instructions 316, may be used to implement a graphical user interface. Implementation of a graphical user interface in this manner is well known to those having ordinary skill in the art. The peripheral interface 310 may include the hardware, firmware and/or software necessary for communication with various peripheral devices, such as media drives (e.g., magnetic disk or optical disk drives), other processing devices or any other input source used in connection with the instant techniques. Likewise, the other output device(s) 312 may optionally comprise similar media drive mechanisms, other processing devices or other output destinations capable of providing information to a user of the device 300, such as speakers, LEDs, tactile outputs, etc. Finally, the network interface 314 may comprise hardware, firmware and/or software that allows the processor 302 to communicate with other devices via wired or wireless networks, whether local or wide area, private or public, as known in the art. For example, such networks may include the World Wide Web or Internet, or private enterprise networks, as known in the art.

While the device 300 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Further still, other implementations of the device 300 may include a greater or lesser number of components than those illustrated. Once again, those of ordinary skill in the art will appreciate the wide number of variations that may be used is this manner. Further still, although a single processing device 200 is illustrated in FIG. 2, it is understood that a combination of such processing devices may be configured to operate in conjunction (for example, using known networking techniques) to implement the teachings of the instant disclosure.

Figure 4:
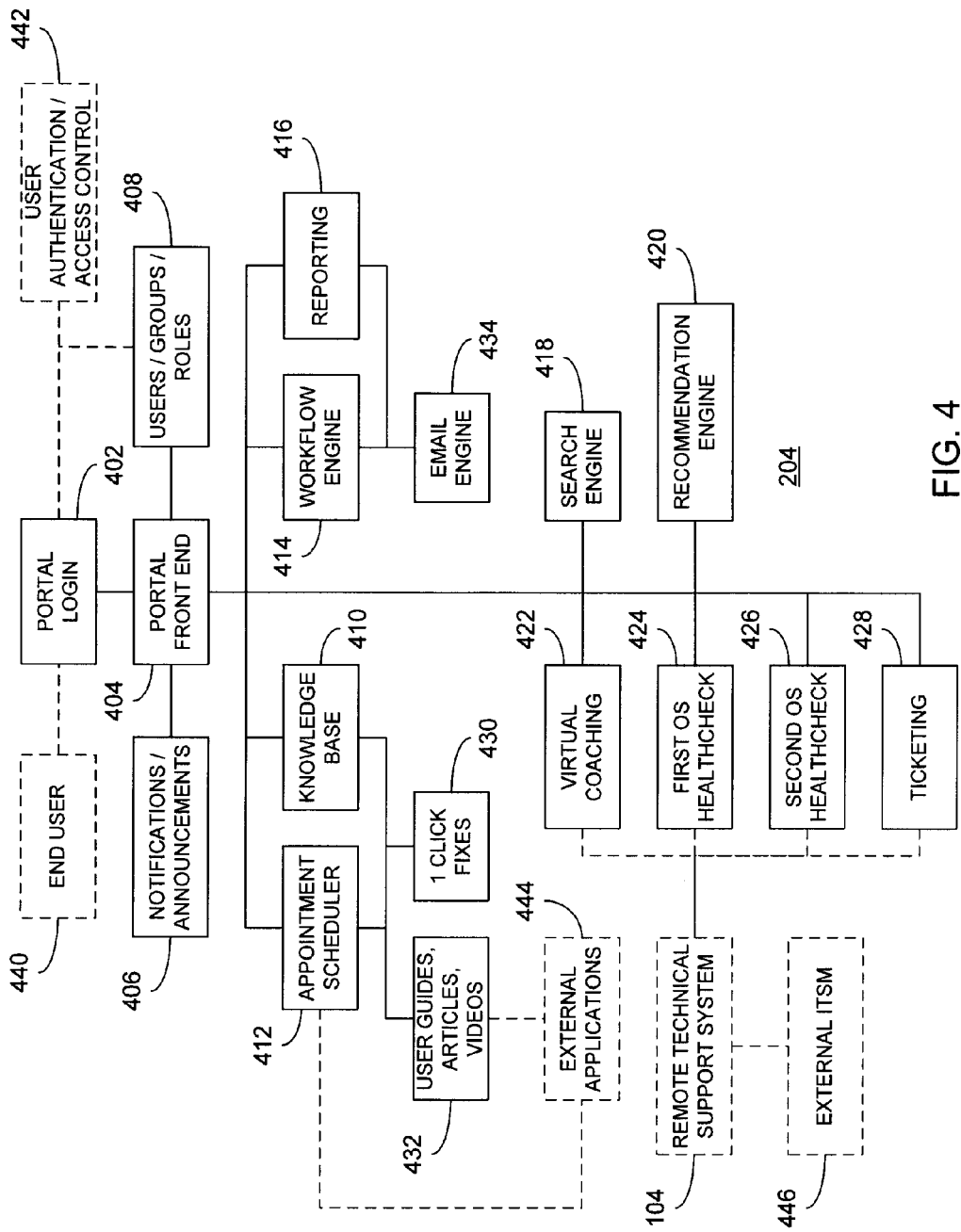
FIG. 4 is a block diagram schematically illustrating in greater detail an embodiment of an end-user portal system in accordance with the instant disclosure.

Referring now to FIG. 4, the end-user portal system 204 is schematically illustrated in further detail. In particular, the end-user portal system 204 comprises a portal login 402 operatively connected to a portal front end 404. The portal login 402 comprises an a component capable of providing an active webpage or the like through which an end-user is permitted to access the end-user portal system 204 after providing the necessary verifying credentials (such as, but not limited to, an account name and password) or engaging in enrollment steps as known in the art. The portal front end 404 is a component comprising those control functions and webpage generation capabilities used to implement the portal system 204. For example, the portal front end 404 causes graphical user interface content (such as that illustrated in FIG. 6) to be presented to an end-user that has accessed the portal system 204. As used herein, a component comprises specific functional capabilities implemented according to the needs of the specific functionality. Generally, a component as used herein is implemented based on a suitably programmed processing device (such as a server computer) implementing stored instructions, or a hardware equivalent thereof. For example, in the case of a component that generates a web page or the like, the component may comprise a server computer implementing the necessary server software to generate the web page. Likewise, a component that manages stored data may be implemented by a database server computer implementing suitable database management software. As illustrated, the portal front end 404 is connected to a variety of other components.

First, the portal front end 404 is operatively coupled to a notifications/announcements component 406 that may be used to provide specific communications to end-users, which may be particularly useful, for example, in an enterprise context in which it is desired to reinforce specific policies, announce new services/operating capabilities, etc. The portal front end 404 may also be operatively connected to a users/groups/roles component 408 that tracks activities performed by a user and maintains permission attributes for each user on the portal system 204. For example, the users/groups/roles component 408 can implement a user profile for each end-user that includes a copy of information about the end-user, including but not limited to, a profile photo of the end-user as well as information specifying contributions the end-user has made to the portal by creating/editing content, adding comments, adding reviews, etc. In an embodiment, activities that a user participates in and ratings a user receives on their content will generate a point score that establishes a user's reputation, which may also be tracked within the user's profile. Further still, within a profile, an end-user can receive updates on comments, reviews, and topics he/she is following. Techniques for implementing such functionality are well known in the art. In a similar vein, the users/groups/roles component 408 can store information regarding user groups that will also define the capabilities and access a user will have to the portal. Control and maintenance of such group designations can be handled by a portal administrator, as known in the art.

As further shown, the portal front end 404 is operatively connected to a knowledge base component 410. The knowledge base component 410 may be used for the storage of all information related to technical support topics (including materials in a variety of forms, such as articles, user guides, videos, end-user dictated content and comments/reviews thereof, as described in further detail below). In an embodiment, information provided to an end-user on the portal system 204 is arranged by technical support topics that are designated according to topic names, descriptions, tags (i.e., metadata that can be used in searching for topics) and, if available, images. Likewise, materials listed under a given topic may comprise suitable identifying/descriptive data such as titles, descriptions and tags. Within a given topic, materials may be rated by end-users using any suitable technique, which rating information is stored within the knowledge base component 410. For example, content may be rated using the well-known "thumbs up" or "thumbs down" convention. Additionally, comments and/or reviews may be associated with a given technical support topic and stored by the knowledge base component 410, which comments/reviews may also be rated, as known in the art. As with existing social networking sites, comments and reviews may also be "followed" by an end-user such the end-user is notified whenever an update is made to the comment/review.

The portal front end 404 may be operatively connected to an appointment scheduler component 412. In an embodiment, the appointment scheduler component 412 permits an end-user to schedule an appointment with technician. For example, in one embodiment, the appointment scheduler component 412 interfaces with a suitable calendar application (such as, for example, Google Calendar) that tracks available time slots and schedule appointments for each remote technician. In this embodiment, the calendar application permits the end-user's calendar to be updated accordingly such that all management of scheduled appointments is handled through the end-user's calendar rather than the portal.

As further shown in FIG. 4, both the knowledge base component 410 and appointment scheduler component 412 may be operatively connected to a 1-click fix component 430 and a materials component 432. The 1-click fix component 430 comprises storage for scripts that, when executed (e.g., when a user clicks on an appropriate link), are targeted to resolving common technical issues, particularly for technical issues that may implemented on an end-user device 102 used to access the portal system 204. In one embodiment, such scripts are available for different computing environments as determined, for example, by different computer operating systems. Implementation of such scripts is well known in the art. The materials component 432 stores the various materials to be made available via the portal system 204, such as the articles, user guides and videos noted above. However, those skilled in the art will appreciate that virtually any type of material or content that may be provided via a graphical user interface may be used in conjunction with the teachings of the instant disclosure. The illustrated operative connection between the knowledge base component 410 and the appointment scheduler component 412 on the one hand, and the 1-click fix component 430 and the materials component 432 on the other, permit information regarding usage of specific 1-click fixes or materials by an end-user to be provided to technicians that are later called upon by the end-user to further assist with the resolution of that end-user's technical issue(s). That is, any usage of 1-click fixes and material reading by the end-user is stored as reference information to schedule an appointment with a technician such that the technician subsequently servicing that appointment will have a full record concerning the end-user's prior attempts to resolve his/her technical issue(s), thereby reducing redundant work and improving efficiency.

The workflow engine component 414 is provided to control processing of requests for technical support. For example, the workflow engine component 414 maintains data regarding who should approve certain types of requests (e.g., software, hardware, and service) based at least in part upon the identity of the specific end-user making the request and predetermined business rules. As a further example, the workflow engine component 414 determines which technician should be assigned to a given request for technical services as well as the required timeframe for providing the technical support service. As shown, the workflow engine component 414 is operatively connected to an email engine component 434, thereby permitting the workflow engine component 414 to cause emails (or other message forms) to be sent to the relevant approver, technician and/or end-user concerning, for example, the process status and result. A reporting component 416 is operatively connected to the portal front end 404. The reporting component 416, which may be implemented using an suitable database query application or management system to obtain data from the various databases maintained by the portal system 204 provide them as reports, as known in the art. As further illustrated in FIG. 4, the reporting component 416 is also operatively connected to the email engine component 434 thereby permitting the generated reports to be sent to any relevant entities.

The portal front end 404 is operatively connected to a search engine 418 that provides end-users with the ability to search the knowledge base component 410 (and external third party sites) for relevant information based on a user's query. To this end, and in one embodiment, information or content stored in the knowledge base component 410 can be filtered based on ratings and tags. The search engine component 418, which may comprise any known or proprietary web-based searching algorithm or service, performs a relevance-based search to identify all topics and related materials. Items returned in such a search may be ordered based on their end-user ratings, e.g., from those results have the most "thumbs up" reviews to those having the least. Regardless, the search results can be filtered, as known in the art according to additional search inputs, such as tags, item type, and rating. Furthermore, the search engine component 418 can be configured to perform searches on, and return results from, external third-party websites and the like. Regardless of what specific resources are searched, the queries and resulting search results can be stored for subsequent use in reporting and for recommendation purposes, as known in the art.

In order to provide such recommendations, the portal front end 404 is operatively connected to a recommendation engine 420 that is used to provide estimates of most relevant information based on end-user activities on the portal. Thus, as an end-user performs activities on the portal system 204 (e.g., selecting certain topics and their corresponding ratings, providing specific search terms in search queries, etc.), recommendations are presented to the end-user concerning relevant articles, user guides, 1-click fixes, etc. In an embodiment, any suitable public or proprietary algorithm may be used for making the recommendations to the end-user. Based on the information thus determined, customized recommendations can be made to the end-user as a potential resolution to their technical support needs. For example, to recommend a specific 1-click fix to an end-user, historical usage by that end-user of all available 1-click fixes as well as usage of such 1-click fixes by a group of other end-users having profiles similar to the end-user can be combined according to a weighted average or the like. Those having ordinary skill in the art will appreciate that other recommendation algorithms could be equally employed.

A virtual coaching component 422 is operatively connected to the portal front end 404. Virtual coaching may combine instructional materials with live assistance from a support technician, and the virtual coaching component 422 provides the necessary functionality to support this. For example, if an organization updates the operating system on a large number of computers, and a corresponding number of end-users want to learn about the new operating system, each end-user can start a coaching session comprising live chatting with simultaneous step-by-step walkthrough instruction via screen-sharing.

As noted above, 1-click fixes specific to different computing environments may be provided. In a similar vein, healthcheck components 424, 426 specific to different computing environments may also be operatively connected to the portal front end component 404. As used herein, a healthcheck component comprises a tool that that downloads, installs, and scans and end-user device for targeted items and reports back the scan results with recommended actions. As illustrated in FIG. 4, there are two healthcheck components 424, 426 configured for operation with first and second operating systems. For example, the first operating system (OS) may comprise an operating system provided by Apple Inc. such as Mac OS X, whereas the second operating system my comprise an operating system provided by Microsoft Inc. such as Windows 7. Those having ordinary skill in the art will appreciate that any of a number of well-known operating systems may be supported in this manner. In this case, the first OS healthcheck component 424 may perform checks of: (i) the size of any temporary files and the trash bin, (ii) a cycle count of the batter and its condition, (iii) a power on self test diagnostic, (iv) the status of system profiler memory, (v) the firmware version and (vi) the existence of software updates. Furthermore, the second OS healthcheck component 426 in this case may perform checks of: (i) the size of any temporary files and the trash bin, (ii) a virus scan, (iii) whether an optimal page size is set, (iv) the amount of available space on the primary hard drive, (v) whether a security product is installed and (vi) whether the browser application has an appropriate security level set. In either embodiment, the results of the health check operation is the return of a results file that may be employed by the portal system 204 to provide recommended courses of action for the end-user to consider (via, for example, the recommendation engine component 420).

As further shown in FIG. 4, the portal front end component 404 may be operatively connected to a ticketing component 428 that operates to create incidents or tickets prior to involvement of any technical support technicians. As known in the art, such tickets establish the context for a technician when asked to provide specific technical support to an end-user. Through the creation of tickets representing each request for technical support, the progress of work regarding each request can be tracked through the portal system 204. In an embodiment, when a ticket is created, an end-user can provide information (via, for example, the use of various data input mechanisms known in the art) about the technical issue with which the end-user requires assistance, such as application troubleshooting, email issues, hardware failures, installations/upgrades, network and/or wireless issues, printing issues, security/virus issues, software installation/removal, etc. The end-use can further provide a description of the issue and an indication of its criticality. Additionally, other information about the user such as name, email address, phone number, etc. may be pulled from the end-user profile noted above. Further still, if made available previously, any information regarding the end-user device may also be obtained. To this end, the product information may be determined based on a specific topic accessed by the end-user or via an end-user input mechanism. To facilitate tracking, and as known in the art, each ticket may include a uniquely-identifying incident number, a description of the technical issue and a status, amongst other information.

As known in the art, in addition to providing technical support services related to end-users' particular technical issues, it is not uncommon to also provide request fulfillment support, as in the case, for example, of end-users request new/replacement equipment. While such fulfillment support is often handled via a separate system (apart from the technical support system), the ticketing component 428 may also be configured to handle such requests.

Finally, as illustrated by the elements shown with dashed lines in FIG. 4, the end-user portal system 204 may interface with various external components/devices/entities as shown. For example, as noted above, and end-user device 440 can access the portal login component 402. Likewise, the portal login component 402 can be operatively connected to an external user authentication/access control component 442 that may be used to control how specific individuals (and groups of individuals) are allowed to interact with the portal system 204. For example, in an embodiment, the external user authentication/access control component 442 may be implemented using Active Directly Federated Services (ADFS) from Microsoft Inc., particularly where the portal system is implemented in an enterprise environment.

As further shown, a variety of external applications 444 can also be interfaced with the portal system 204. For example, various applications are available from Google Inc., including applications for hosting videos, hosting software downloads, etc., which applications may be useful in providing the services offered by the portal system 204. Further still, those components 422-428 described above in connection with ascertaining the context of a given end-user's situation may be operatively connected to a remote technical support system 104, such as that described above, in order to provide the connectivity to remote support technicians, and workflow management thereof. As further shown, the remote technical support system 104 may be further operatively connected to an external information technology service management (ITSM) system 446, which may comprise legacy technical support systems as may be the case, for example, in an enterprise deployment.

Figure 5:
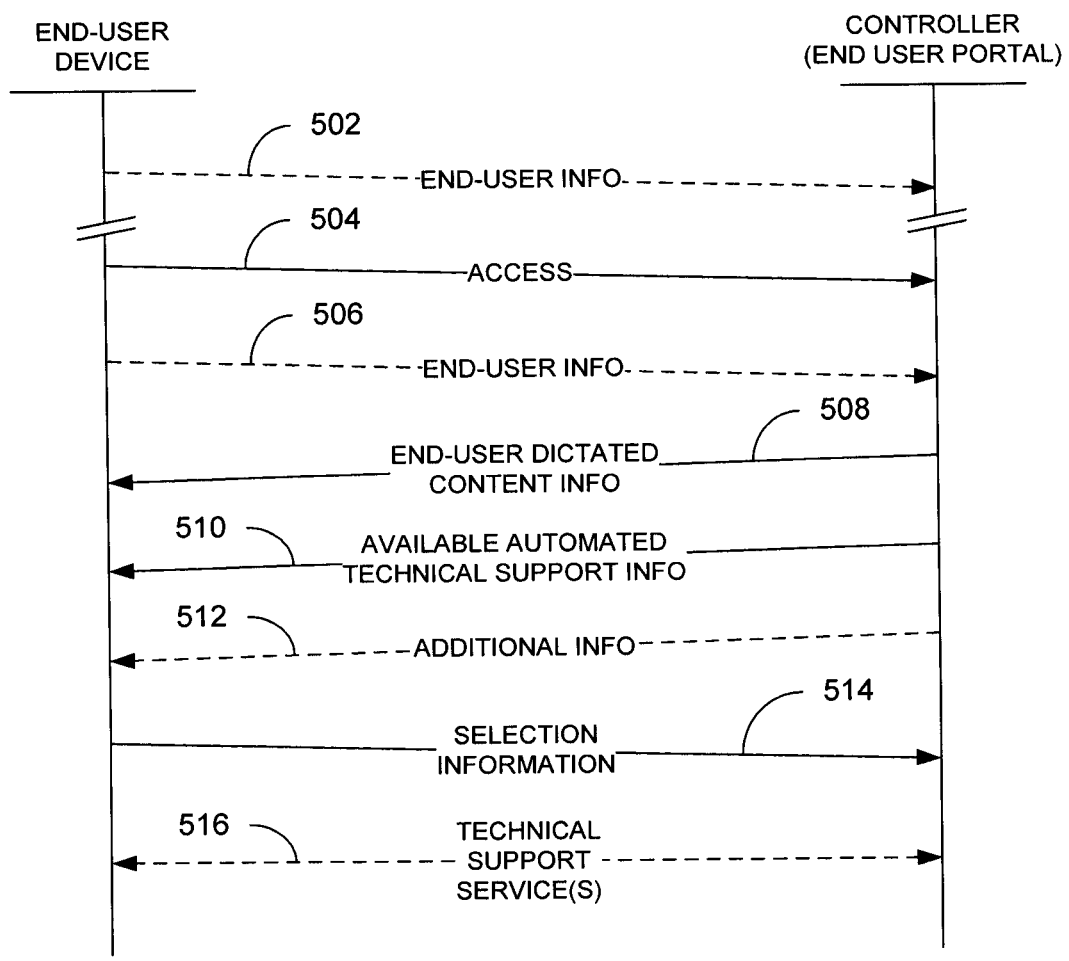
FIG. 5 is a sequence diagram illustrating interactions between a user device and a technical support controller in accordance with an embodiment of the instant disclosure.

Referring now to FIG. 5, a sequence diagram illustrating interactions between an end-user device and a technical support controller (via the end-user portal) is provided. In one implementation, the processing illustrated in FIG. 5 is carried out through the execution of stored instructions executed by one or more processors and associated hardware as illustrated, for example, in FIG. 3, used to implement the end-user device and technical support controller.

Regardless, processing begins where an end-user accesses the end-user portal 504 via, for example, an end-user device. As noted above, while it will often be the case that the end-user device used to access the end-user portal is also the device for which the end-user is seeking technical support, this need not always be the case. Such access to the end-user portal may be supplied via a portal login webpage or the like. Optionally, as indicated by the dashed lines, end-user information 502 may be provided to the end-user portal earlier than the initial access 504, in some cases, much earlier. For example, during an enrollment phase or a prior service request, the end-user information 502 may have been provided to the end-user portal, which, as described above, may store such end-user information in a user profile. Further still, end-user information 506 may be optionally provided to the end-user portal subsequent to the access 504 of the end-user portal. For example, having accessed the end-user portal, the end-user may choose to perform account maintenance activities to update information about himself/herself. As used herein, end-user information 502, 506 may comprise any information about the end-user him/herself (such as identifying/authenticating information), about the end-user's prior requests for technical support and their subsequent status or resolution, or about the end-user's device itself.

Based on the end-user's access 504 of the end-user portal, processing continues with the end-user portal providing, and the end-user device receiving, information regarding end-user dictated content for a plurality of technical support topics 508. It is noted that the information regarding end-user dictated content 508 is provided to the end-user device prior to end-user having provided any indication of specific technical support required by the end-user. In other words, information regarding end-user dictated content 508 is provided simply based on the end-user's access to the end-user portal, and not in response to any specific inquiry into or request for technical support. In an embodiment, the information regarding end-user dictated content for the plurality of technical support topics 508 is provided in a form suitable for presentation to the end-user and that permits selection of specific portions of such information. For example, in one embodiment, the information 508 is provided for display via a web page, e.g., hyperlinks, such that an end-user can selected individual portions thereof.

End-user dictated content comprises any materials in which the substantive content of such materials is dictated at least in part by end-users of the portal. For example, in one embodiment, the end-user dictated content may comprise content that may be edited by end-users. So-called wiki pages, which permit and track edits to content by anyone having access to the content, may be used for this purpose, as known in the art. Furthermore, such end-user edits to content may include reviews or comments provided in response to viewing materials provided by the end-user portal.

Alternatively, the information regarding end-user dictated content may comprise information regarding at least one most frequently selected technical support topic of the plurality of technical support topics. Techniques for tracking which technical support topics are most frequently selected are known in the art. For example, the number of times a given technical support topic is selected by end-users may be tracked during a most-recent period of time, such as the previous week or month. The intuition in this embodiment is that end-users tend to have similar, if not identical, technical support issues over a sufficiently long period of time. For example, following a release of an operating system upgrade, there is a good likelihood that a number of end-users will encounter technical issues regarding the OS upgrade, and requests for technical support in this regard will reflect this trend. By recognizing that requests for technical support regarding the OS upgrade have become more frequent, it can be assumed that early provision of information regarding that specific technical support topic is at least somewhat more likely to be of use to any given end-user.

Further still, the information regarding end-user dictated content may comprise information regarding most frequently searched keywords. In this case, the information regarding the most frequently searched keywords may comprise links to search results associated with the most frequently searched keywords. Much like the intuition regarding most frequently selected technical support topics, information regarding most frequently searched keywords (as collected, for example, by the search engine component 418) is more likely to reflect technical support issues of concern to a given end-user. Once again, techniques for determining such information regarding most frequently searched keywords are well known in the art.

As further illustrated in FIG. 5, and in response to the end-user's access 504 of the end-user portal, processing continues with the end-user portal providing, and the end-user device receiving, information regarding available automated technical support 510. Once again, it is noted that the information regarding available automated technical support 510 is provided to the end-user device prior to end-user having provided any indication of specific technical support required by the end-user. As before, the information regarding available automated technical support 510 is provided in a form suitable for presentation to the end-user and that permits selection of specific portions of such information, e.g., hyperlinks, etc. In the context of the instant disclosure, the information regarding available automated technical support 510 comprises information regarding automated processing that may be performed on the end-user device. For example, the information regarding available automated technical support may comprise information regarding the available 1-click fixes (as provided by the 1-click fixes component 430).

In an embodiment, the information regarding the available automated technical support 510 is selected by the end-user portal based at least in part upon information regarding the end-user. That is, to the extent that the information about the end-user can provide the end-user portal with some insight as to the end-user's likely needs, it may be used to develop potential recommendations (as generated, for example by the recommendation component 420) for automated technical support. For example, such information, as noted above, may include the end-user's prior history of technical support requests. Based on this information, the end-user portal can determine that certain available automated technical support options may be more likely to be useful to the end-user to the extent that it relates to technical issues previously experienced by end-user. Still other information about the end-user could be used for this purpose. For example, knowledge about the particular type of device used by the end-user could be employed to select automated solutions that are most applicable to the type of device. In yet another embodiment, patterns of usage patterns for specific resources of the end-user device (e.g., specific hardware/software, in the case of a computer or similar device) or similar patterns across a group of other end-user having similar characteristics to the end-user (e.g., similar devices, geographic location or job-responsibilities within an enterprise) could also be used for this purpose.

As further shown in FIG. 5, additional information 512 may be provided by the end-user portal to the end-use device. Such additional information 512 may comprise other information regarding options other than the end-user dictated content or the available automated technical support that may be provided by the end-user portal. For example, information regarding mechanisms for initiating communications with a remote technician may be provided. Further still, information regarding the end-user's account may be provided. Regardless, such additional information 512 may be displayed to the end-user as part of a user interface.

Figure 6:
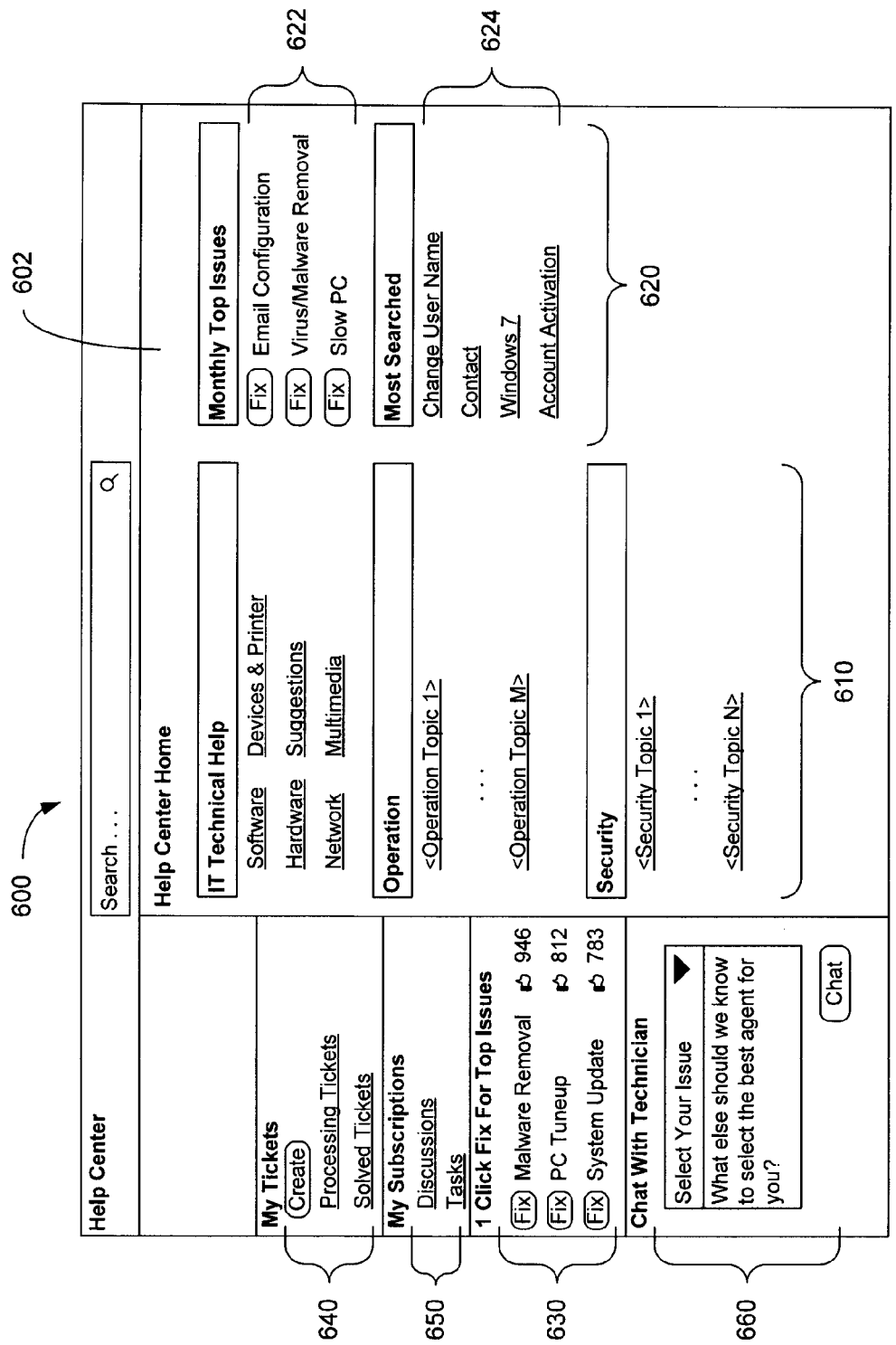
FIG. 6 illustrate an example of a graphical user interface that may be used in conjunction with the various embodiments described herein.

Upon receiving the information regarding end-user dictated content 508 and the information regarding available automated technical support 510, the end-user device can present the information to the end-user, for example, via a suitable graphical user interface. An example of such an interface is illustrated in FIG. 6. In particular, FIG. 6 illustrates a graphical user interface 600 comprising a technical issues content area 602. Techniques for providing such graphical user interfaces are well known in the art and need not be described in further detail here. The technical issues content area 602 is used to display the information regarding the end-user dictated content. In the illustrated example, the information regarding the end-user dictated content is divided up into topic-oriented information 610 and top lists 620. In FIG. 6, underlined text is used to illustrate hyperlinks that, as known in the art, may be selected by an end-user to access underlying content of interest. For example, within the topic-oriented information 610, a variety of support topics (e.g., "IT Technical Help", "Operation" and "Security") and corresponding support sub-topics 612 (e.g., "Software", "Hardware", "Network", "Devices & Printer", "Suggestions", "Multimedia") are presented. Selection of any of the illustrated hyperlinks causes content corresponding to the selected topic/sub-topic to be displayed to the end-user. As noted above, such content may take a variety of forms, including end-user editable content presented, for example, in a wiki page format. Still other formats that permit end-user edits (as well as comments and reviews) will be apparent to those having ordinary skill in the art. In a similar vein, the top lists 620 may include top issues and most searched keywords lists as shown and described above. In the example of FIG. 6, each of the identified top issues may also include a "Fix" button that, when selected by the end-user, causes automated processing to occur. However, it is understood that each of the top issues could also be implemented on the interface 600 as hyperlinks as well.

As further shown in FIG. 6, the information regarding available automated technical support 630 is also provided via the graphical user interface, in this case, as a plurality of 1-click fixes. As noted above, review data by end-users may be included as part of the displayed information. This is illustrated in conjunction with the information regarding available automated technical support 630, where selectable "thumbs up" icons and the corresponding number of user that have selected that icon are displayed alongside specific 1-click fixes. In this manner, an end-user can get an impression how effective the overall community of end-users views the various options presented. Once again, other techniques for accepting and illustrating end-user edits will be known to those having ordinary skill in the art.

FIG. 6 also illustrates other features of the interface 600, including a "My Ticket" area 640 that illustrates a given end-user's currently pending and previously resolved requests for technical support. Selection of the illustrated links allow the end-user to access information about those requests for technical support, which may include information about the specific technical issues addressed as well as the techniques employed to resolve them. Furthermore, a "My Subscriptions" area 650 is provided that allows an end-user to view discussions or tasks that he/she may monitor. For example, a end-user may want to keep abreast of any discussions concerning a specific technical support topic. By selecting the "Discussions" link, he/she is able to request updates to any relevant discussions. Alternatively, the "Tasks" link allows the end-user to view a list of action items that have been assigned to that end-user. For example, in an enterprise context, an end-user having particular skill or knowledge with regard to a given technical issue may be assigned to task to develop instructional materials by an administrator of the end-user portal.

Finally, FIG. 6 also illustrates a mechanism 660 to initiate communication with a technical support technician. In this case, the mechanism 660 comprises a chat interface coupled with a pull down menu, as known in the art, whereby a user can initiate a chat session directly with a remote technician after specifying information regarding a his/her current issue. Once again, those having ordinary skill in the In those instances in which the end-user decides to employ the mechanism 660 to initiate a session with a remote technician, control of that session may be passed from the end-user portal system 204 over to the remote technical support system 104. In this sense, the end-user portal system 204 serves as a different pathway to the remote technical support system 104.

Referring once again to FIG. 5, selection information 514 may be provided by the end-user device to the end-user portal, which selection information concerns specific selections made by an end-user in response to the information 508, 510 previously provided. For example, and with reference once again to FIG. 6, such selection information may comprise an indication that the end-user selected a particular hyperlink, button or other user-input mechanism. Regardless, based on the selection information 514, the end-user portal may provide the desired technical support services 516, which is illustrated as a bi-direction arrow in FIG. 5 to reflect the fact that such support services are often an interactive process.

While particular preferred embodiments have been shown and described, those skilled in the art will appreciate that changes and modifications may be made without departing from the instant teachings. It is therefore contemplated that any and all modifications, variations or equivalents of the above-described teachings fall within the scope of the basic underlying principles disclosed above and claimed herein.

What is claimed is:

1. A method comprising:
providing, by a device to an end-user device and prior to the device receiving an indication of specific technical support required by the end-user device, information regarding end-user dictated content for a plurality of technical support topics,
the end-user dictated content being based on information regarding the plurality of technical support topics, the information regarding the plurality of technical support topics being based on information received from a plurality of end-user devices during a particular period of time;

providing, by the device to the end-user device and prior to the device receiving the indication of the specific technical support required by the end-user device, information regarding available automated technical support, the available automated technical support being selected by the device based on information regarding usage patterns of particular resources of the end-user device and based on information regarding similar usage patterns between an end-user, of the end-user device, and a group of other end-users, the particular resources of the end-user device including particular hardware of the end-user device, and the group of other end-users having at least one characteristic in common with the end-user, the at least one characteristic including a geographic location;

receiving, by the device from the end-user device, an indication of a selection of at least a portion of at least one of:

information regarding end-user dictated content for at least one technical support topic of the plurality of technical support topics, or the information regarding the available automated technical support;

determining, by the device and based on the received indication of the selection, the specific technical support required by the end-user device; and providing, by the device and based on determining the specific technical support required by the end-user device, the specific technical support required by the end-user device.

2. The method of claim 1, where, when providing the information regarding the end-user dictated content, the method includes:

providing information regarding at least one frequently selected technical support topic of the plurality of technical support topics.

3. The method of claim 1, where, when providing the information regarding the end-user dictated content, the method includes:

providing information regarding frequently searched keywords.

4. The method of claim 1, where the available automated technical support is selected by the device based on the information regarding the usage patterns of particular resources of the end-user device and based on the information regarding the similar usage patterns between the end-user and the group of other end-users, and where, when providing the information regarding the end-user dictated content, the method includes:

providing content regarding the plurality of technical support topics, the content being editable by the end-user device.

5. The method of claim 1, where, when providing the information regarding the available automated technical support, the method includes:

providing information regarding automated processing that may be performed on the end-user device.

6. The method of claim 1, further comprising:

providing, by the device to the end-user device and prior to the device receiving the indication of the specific technical support required by the end-user device, information regarding a mechanism to initiate communication with a technical support technician.

7. The method of claim 6, further comprising:

receiving, by the device from the end-user device, an indication of a selection of the mechanism to initiate communication with the technical support technician.

8. A method comprising:

receiving, by an end-user device from a device prior to the device receiving an indication of specific technical support required by the end-user device, information regarding end-user dictated content for a plurality of technical support topics, the end-user dictated content being based on information regarding the plurality of technical support topics, the information regarding the plurality of technical support topics being based on information received from a plurality of end-user devices during a particular period of time;

receiving, by the end-user device from the device prior to the device receiving the indication of the specific technical support required by the end-user device, information regarding available automated technical support, the available automated technical support being selected by the device based on information regarding usage patterns of particular resources of the end-user device and based on information regarding similar usage patterns between an end-user, of the end-user device, and a group of other end-users, the particular resources of the end-user device including particular hardware of the end-user device, and the group of other end-users having at least one characteristic in common with the end-user, the at least one characteristic including a geographic location;

providing, by the end-user device and to the device, an indication of a selection of at least a portion of at least one of:

information regarding end-user dictated content for at least one technical support topic of the plurality of technical support topics, or the information regarding the available automated technical support; and receiving, by the end-user device, from the device, and based on the device determining the specific technical support required by the end-user device, the specific technical support required by the end-user device.

9. The method of claim 8, where, when receiving the information regarding the end-user dictated content, the method includes:

receiving information regarding at least one frequently selected technical support topic of the plurality of technical support topics.

10. The method of claim 8, where, when receiving the information regarding the end-user dictated content, the method includes:

receiving information regarding frequently searched keywords.

11. The method of claim 8, where, when receiving the information regarding the end-user dictated content, the method includes:

receiving content regarding the plurality of technical support topics, the content being editable by the end-user device.

12. The method of claim 8, where, when receiving the information regarding the available automated technical support, the method includes:
receiving information regarding automated processing that may be performed on the end-user device.

13. The method of claim 8, further comprising:
receiving, by the end-user device, from the device, and prior to the device receiving the indication of the specific technical support required by the end-user device, information regarding a mechanism to initiate communication with a technical support technician.

14. The method of claim 13, further comprising:
providing, by the end-user device and to the device, an indication of a selection of the mechanism to initiate communication with the technical support technician.

15. An apparatus comprising:
a memory to store instructions; and
a processor to execute the instructions to:
provide, to an end-user device prior to receiving an indication of specific technical support required by the end-user device, information regarding end-user dictated content for a plurality of technical support topics,
the end-user dictated content being based on information regarding the plurality of technical support topics,
the information regarding the plurality of technical support topics being based on information received from a plurality of end-user devices during a particular period of time;
provide, to the end-user device and prior to receiving the indication of the specific technical support required by the end-user device, information regarding available automated technical support,
the available automated technical support being selected by the apparatus based on information regarding usage patterns of particular resources of the end-user device and based on information regarding similar usage patterns between an end-user, of the end-user device, and a group of other end-users,
the particular resources of the end-user device including particular hardware of the end-user device, and
the group of other end-users having at least one characteristic in common with the end-user,
the at least one characteristic including a geographic location;
receive, from the end-user device, an indication of selection of at least a portion of at least one of:
information regarding end-user dictated content for at least one technical support topic of the plurality of technical support topics, or
the information regarding the available automated technical support;
determine, based on the received indication of the selection, the specific technical support required by the end-user device; and
provide, based on determining the specific technical support required by the end-user device, the specific technical support required by the end-user device.

16. The apparatus of claim 15, where the processor, when providing the information regarding the end-user dictated content, is to:
provide information regarding at least one frequently selected technical support topic of the plurality of technical support topics.

17. The apparatus of claim 15, where the processor, when providing the information regarding the end-user dictated content, is to:
provide information regarding frequently searched keywords.

18. The apparatus of claim 15, where the processor, when providing the information regarding the end-user dictated content, is to:
provide content regarding the plurality of technical support topics,
the content being editable by the end-user device.

19. The apparatus of claim 15, where the processor, when providing the information regarding the available automated technical support, is to:
provide information regarding automated processing that may be performed on the end-user device.

20. The apparatus of claim 15, where the processor is further to:
provide, to the end-user device and prior to receiving the indication of the specific technical support required by the end-user device, information regarding a mechanism to initiate communication with a technical support technician.

21. The apparatus of claim 20, where the processor is further to:
receive, from the end-user device, an indication of a selection of the mechanism to initiate communication with the technical support technician.

22. An end-user device comprising:
a memory to store instructions; and
a processor to execute the instructions to:
receive, from a device prior to the device receiving an indication of specific technical support required by the end-user device, information regarding end-user dictated content for a plurality of technical support topics,
the end-user dictated content being based on information regarding the plurality of technical support topics,
the information regarding the plurality of technical support topics being based on information received from a plurality of end-user devices during a particular period of time;
receive, from the device prior to the device receiving the indication of the specific technical support required by the end-user device, information regarding available automated technical support,
the available automated technical support being selected by the device based on information regarding usage patterns of particular resources of the end-user device and based on information regarding similar usage patterns between an end-user, of the end-user device, and a group of other end-users,
the particular resources of the end-user device including particular hardware of the end-user device, and
the group of other end-users having at least one characteristic in common with the end-user,
the at least one characteristic including a geographic location;
provide, to the device, an indication of a selection of at least a portion of at least one of:
information regarding end-user dictated content for at least one technical support topic of the plurality of technical support topics, or the information regarding the available automated technical support; and receive, from the device and based on the device determining the specific technical support required by the end-user device, the specific technical support required by the end-user device.

23. The end-user device of claim 22, where the processor, when receiving the information regarding the end-user dictated content, is to:

receive information regarding at least one frequently selected technical support topic of the plurality of technical support topics.

24. The end-user device of claim 22, where the processor, when receiving the information regarding the end-user dictated content, is to:

receive information regarding frequently searched keywords.

25. The end-user device of claim 22, where the processor, when receiving the information regarding the end-user dictated content, is to:

receive content regarding the plurality of technical support topics, the content being editable by the end-user device.

26. The end-user device of claim 22, where the processor, when receiving the information regarding the available automated technical support, is to:

receive information regarding automated processing that may be performed on the end-user device.

27. The end-user device of claim 22, where the processor is further to:

receive, from the device and prior to the device receiving the indication of the specific technical support required by the end-user device, information regarding a mechanism to initiate communication with a technical support technician.

28. The end-user device of claim 27, where the processor is further to:

provide, to the device, an indication of a selection of the mechanism to initiate communication with the technical support technician.

* * * * *